(12) United States Patent
Su et al.

(10) Patent No.: US 9,092,306 B1
(45) Date of Patent: Jul. 28, 2015

(54) LIGHTWEIGHT DATA LEAKAGE DETECTION FOR MOBILE COMPUTING DEVICES

(75) Inventors: Chung-Tsai Su, Taipei (TW); Huaide Huang, Taipei (TW); Shun-Fa Yang, Taipei (TW); Geng-Hwang Twu, Banchiao (TW); Haoping Liu, Changhua (TW)

(73) Assignee: Trend Micro Incorporated, Tokyo (JP)

( * ) Notice: Subject to any disclaimer, the term of this patent is extended or adjusted under 35 U.S.C. 154(b) by 489 days.

(21) Appl. No.: 13/457,966

(22) Filed: Apr. 27, 2012

(51) Int. Cl.
*H01L 29/00* (2006.01)
*G06F 11/00* (2006.01)

(52) U.S. Cl.
CPC ........................................ *G06F 11/00* (2013.01)

(58) Field of Classification Search
CPC ................................. G06F 15/16; G06F 11/00
USPC ......................................... 726/22, 24; 709/206
See application file for complete search history.

(56) References Cited

U.S. PATENT DOCUMENTS

| | | | |
|---|---|---|---|
| 5,966,702 A | 10/1999 | Fresko et al. | |
| 8,504,622 B1 * | 8/2013 | Mariswamy et al. | 709/206 |
| 8,528,080 B2 * | 9/2013 | McCorkendale et al. | 726/22 |

OTHER PUBLICATIONS

Lei Liu and Songqing Chen "Malyzer: Defeating Anti-detection for Application-Level Malware Analysis", 2009, pp. 201-218, Dept. of Computer Science, George Mason University.
Dalvik (software)—From Wikipedia, the free encyclopedia, 1 sheet [retrieved on Mar. 28, 2012], retrieved from the internet: http://en.wikipedia.org/wiki/Dalvik_(software).
ProGuard Main, 1 sheet [retrieved on Apr. 3, 2012], retrieved from the internet: http://proguard.sourceforge.net/main.html.
ProGuard / Android Developers, 3 sheets [retrieved on Apr. 3, 2012], retrieved from the internet: http://developer.android.com/guide/developing/tools/proguard.html.
Application Fundamentals / Android Developers, 7 sheets [retrieved on Mar. 28, 2012], retrieved from the internet: http://developer.android.com/guide/topics/fundamental.html.
Github:gist—A reflection hack to override the APK ClassLoader so you can launch Activities in an external JAR, 2 sheets [retrieved on Apr. 16, 2012], retrieved from the internet: https://gist.github.com/839003.

* cited by examiner

*Primary Examiner* — Brandon Hoffman
*Assistant Examiner* — Michael D Anderson
(74) *Attorney, Agent, or Firm* — Okamoto & Benedicto LLP

(57) ABSTRACT

Trap data is stored in a mobile computing device. A lightweight engine monitors outgoing communications in the mobile computing device for the trap data. Data leakage is deemed to have been detected in the mobile computing device when an outgoing communication includes the trap data. A cloud service hosted by a backend system may also be monitoring for the trap data. In the case where the trap data is a trap e-mail address, the cloud service may monitor for an e-mail that is addressed to the trap e-mail address. In response to receiving the e-mail, the cloud service may consult a database to determine that the trap e-mail address is stored in the mobile computing device. Receiving the e-mail indicates that data leakage is occurring in the mobile computing device.

13 Claims, 5 Drawing Sheets

US 9,092,306 B1

LIGHTWEIGHT DATA LEAKAGE DETECTION FOR MOBILE COMPUTING DEVICES

BACKGROUND OF THE INVENTION

1. Field of the Invention

The present invention relates generally to computer security, and more particularly but not exclusively to computer security for mobile computing devices.

2. Description of the Background Art

A mobile operating system, such as the ANDROID operating system, is designed to be suitable for computers that are constrained in terms of memory and processor speed. Accordingly, mobile operating systems are employed in mobile computing devices, such as mobile phones and tablets. Unlike a conventional operating system, a mobile operating system typically does not have provisions for readily hooking into a read event. This allows malicious codes to read data without being detected by a computer security product, such as an antivirus. Another problem with mobile operating systems is that they are employed in mobile computing devices, which have relatively low memory and processing resources. As a result, computer security products that run on regular computers, such as desktop and laptop computers, cannot be simply ported to run on mobile computing devices.

SUMMARY

In one embodiment, a method of detecting data leakage includes storing a trap e-mail address in a contact list in a mobile computing device. An e-mail addressed to the trap e-mail address is received in a backend system. The trap e-mail address is determined to be stored in the mobile computing device. In response to receiving the e-mail addressed to the trap e-mail address, data leakage is detected to be occurring in the mobile computing device.

In another embodiment, a system for detecting data leakage comprises a mobile computing device having a storage device storing trap data, the mobile computing device including a lightweight engine configured to detect data leakage in the mobile computing device by monitoring outgoing communications of the mobile computing device for the trap data, and a backend system configured to detect for data leakage occurring in the mobile computing device by monitoring for communications including the trap data.

In another embodiment, a method of detecting data leakage comprises storing trap data in a mobile computing device running a mobile operating system. Outgoing communications in the mobile computing device are monitored for the trap data. Data leakage is detected in the mobile computing device when the trap data is detected in an outgoing communication.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
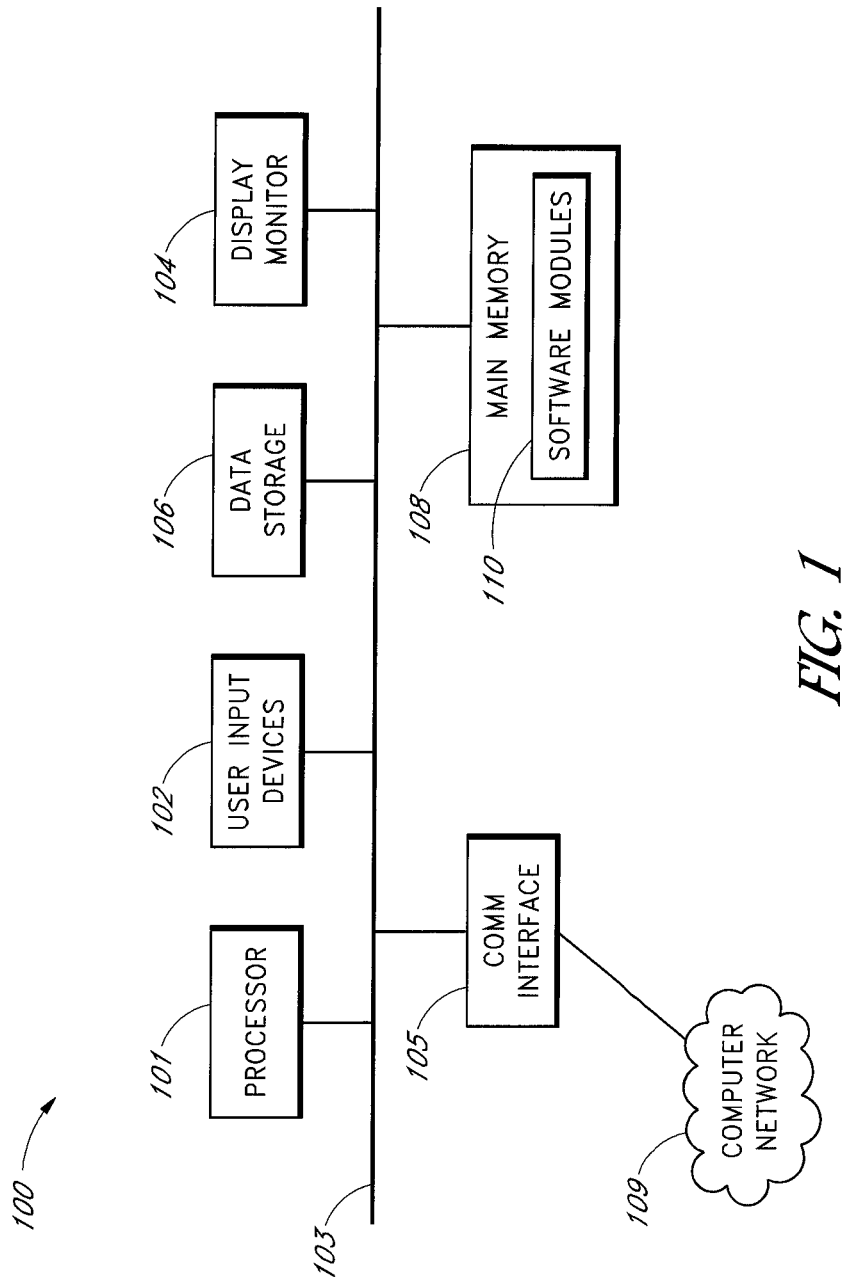
FIG. 1 shows a schematic diagram of a computer that may be employed with embodiments of the present invention.

Referring now to FIG. 1, there is shown a schematic diagram of a computer 100 that may be employed with embodiments of the present invention. The computer 100 may be employed as any of the computers described below. The computer 100 may have fewer or more components to meet the needs of a particular application. The computer 100 may include a processor 101. The computer 100 may have one or more buses 103 coupling its various components. The computer 100 may include one or more user input devices 102 (e.g., touch screen, keyboard, mouse), one or more data storage devices 106 (e.g., hard drive, optical disk, USB memory), a display monitor 104 (e.g., LCD, flat panel monitor, CRT), a communications interface 105 (e.g., network adapter, modem, cellular interface), and a main memory 108 (e.g., RAM). The communications interface 105 may be coupled to a computer network 109, which in this example includes the Internet.

The computer 100 is a particular machine as programmed with software modules 110. The software modules 110 comprise computer-readable program code stored non-transitory in the main memory 108 for execution by the processor 101. For example, the software modules 110 may comprise a mobile operating system 203 and a lightweight engine 320 when the computer 100 is employed as a mobile computing device 200 (see FIGS. 2 and 3). As another example, the software modules 110 may comprise a backend database 411, a mail server 412, and a cloud service 413 when the computer 100 is employed as backend system 410 (see FIG. 4).

The computer 100 may be configured to perform method steps by executing the software modules 110. The software modules 110 may be loaded from the data storage device 106 to the main memory 108. The software modules 110 may also be made available on other computer-readable storage medium including optical disk, flash drive, and other memory devices.

Figure 2:
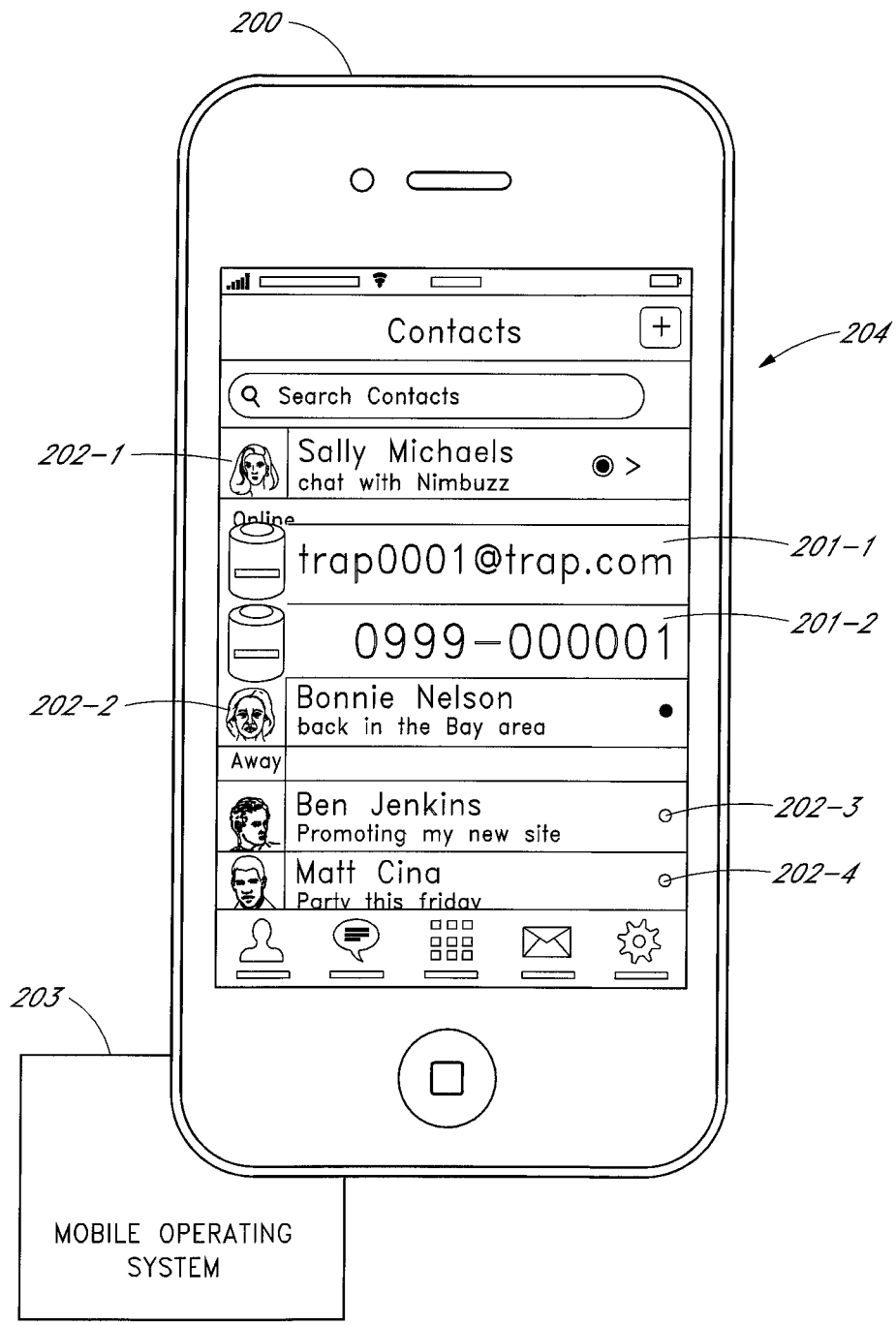
FIGS. 2 and 3 schematically illustrate a method of performing data leakage detection in mobile computing devices in accordance with an embodiment of the present invention.
Figure 3:
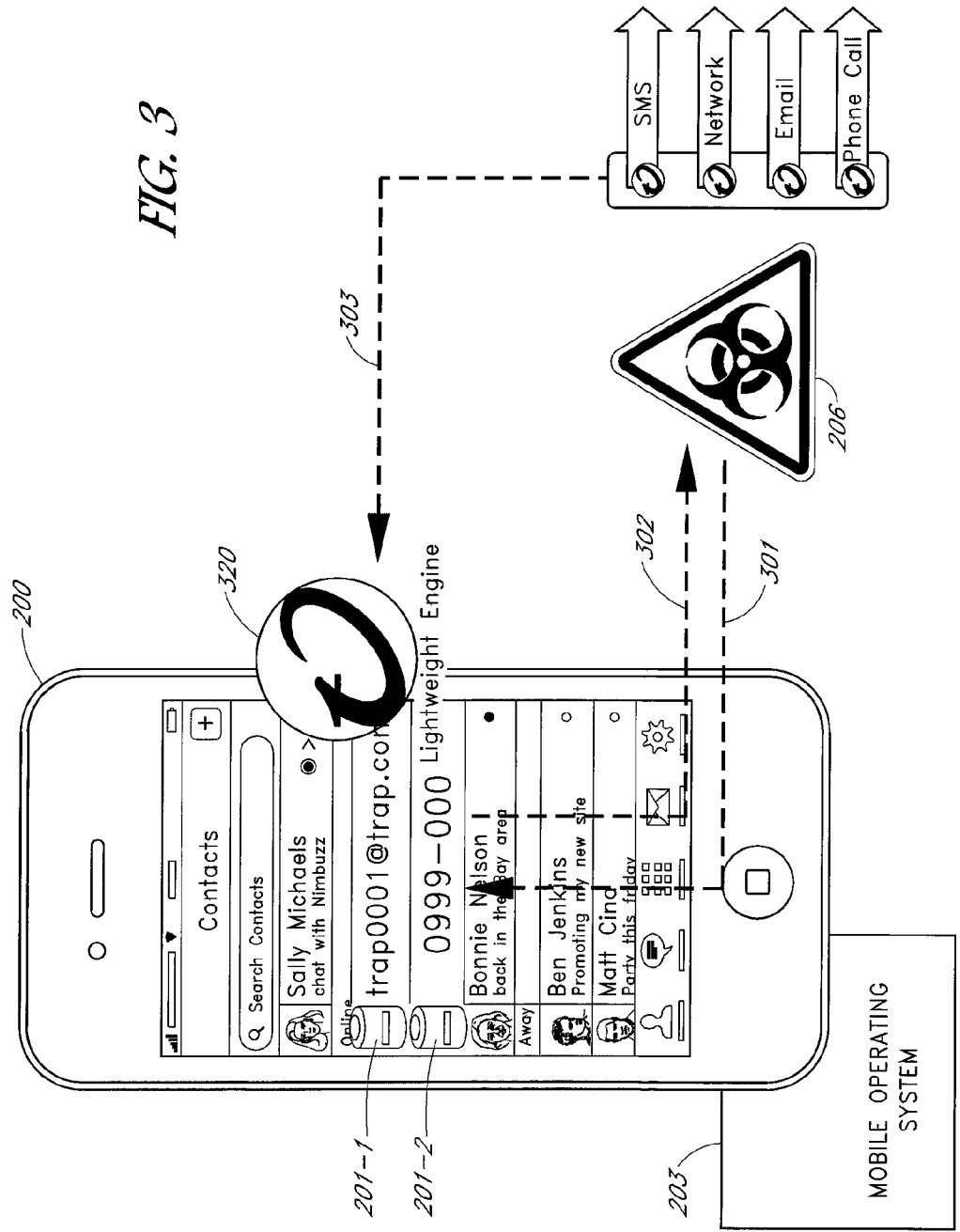

FIGS. 2 and 3 schematically illustrate a method of detecting data leakage in mobile computing devices in accordance with an embodiment of the present invention. As its name implies, data leakage refers to unauthorized transfer of data out of a mobile computing device. Data leakage may occur when malicious code steals data from the mobile computing device by accessing the data and surreptitiously transferring the data to another device without permission from the user of the mobile computing device.

In the example of FIG. 2, a mobile computing device 200 runs a mobile operating system 203. The mobile computing device 200 may comprise a mobile phone or a tablet, for example. The mobile operating system 203 may comprise the ANDROID operating system. The mobile computing device 200 is shown as displaying a contact list 204 that has entries 202 (i.e., 202-1, 202-2, 202-3, 202-4) for the user's contacts.

An entry 202 may include typical contact information, such as a phone number, address, and e-mail address of the contact. An entry 202 is a "real" entry in that it contains real contact information for the user's contact.

In one embodiment, the contact list 204 further includes trap entries 201 (i.e., 201-1, 201-2). A trap entry 201 is not a real entry in that it does not contain real contact information of a real contact. In one embodiment, a trap entry 201 comprises trap data for a fictitious contact. The trap entry 201 may be entered by the installation module of the lightweight engine 320 or the lightweight engine 320, for example, solely for the purpose of detecting data leakage. Because the trap data does not comprise real contact information of a real contact, there is no legitimate reason to access and forward the trap data from the mobile computing device 200 to another device. The trap data may include a unique e-mail address or a unique phone number for a fictitious contact. The trap data may be detected locally by the lightweight engine 320 or on the Internet by the backend system 410 to detect data leakage in the mobile computing device 200.

As shown in FIG. 3, the mobile computing device 200 includes the lightweight engine 320. The lightweight engine 320 may comprise computer-readable program code for detecting data leakage in the mobile computing device 200. In one embodiment, the lightweight engine 320 is configured to monitor outgoing communications, such as outgoing short message service (SMS), network data, e-mail, and phone calls, for trap data. For example, assuming the trap data comprises a unique phone number, referred to as "trap phone number," the lightweight engine 320 may look for an outgoing telephone call or SMS to the trap phone number, or for an outgoing network data packet, SMS, or e-mail that contains the trap phone number. As another example, assuming the trap data comprises a unique e-mail address, referred to as "trap e-mail address," the lightweight engine 320 may monitor outgoing SMS, network data packet, and emails for the trap e-mail address.

In one embodiment, the trap entries 201 are entered in the contact list 204 during installation of the lightweight engine 320. Because the trap entries 201 do not contain real contact information, there is no reason for any process to access and forward the contents of the trap entries 201 to another and remotely located device. Accordingly, the lightweight engine 320 detects data leakage when it recognizes trap data being forwarded out of the mobile computing device 200.

In light of the present disclosure, one of ordinary skill in the art will appreciate that trap data for detecting data leakage may be included in applications or files other than a contact list. For example, trap data, such as a trap e-mail or a trap phone number, may be included in a data file. As another example, the trap data may include other traceable and unique information, such as false credit card numbers, false passwords, and so on. A data file containing trap data may be stored in a data storage device of the mobile computing device 200 during installation of the lightweight engine 320.

In the example of FIG. 3, the mobile computing device 200 is infected with malicious code 206. The malicious code 206 may comprise computer-readable program code configured to steal data from the infected device. The malicious code 206 may be configured to forward stolen data to a botnet server 401 (see FIG. 4), for example. The botnet server may sell the stolen data or use the stolen data to perpetrate other malicious activities, such as phishing or spamming.

In the example of FIG. 3, the malicious code 206 accesses (arrow 301) and reads trap data from one or more trap entries 201 (arrow 302). The malicious code 206 then forwards the trap data to another device external of the mobile computing device 200. The lightweight engine 320 monitors outgoing communications in the mobile computing device 200 (arrow 303), and recognizes trap data as being included in one of the outgoing communications. For example, the malicious code 206 may obtain the trap e-mail address from the trap entry 201-1 and forward the trap e-mail address out of the mobile computing device 200 by e-mail. The lightweight engine 320 detects the data leakage when it recognizes the trap e-mail address in an outgoing e-mail.

The lightweight engine 320 may perform one or more actions in response to detecting data leakage. In one embodiment, the lightweight engine 320 alerts the user by displaying a message on the screen of the mobile computing device 200, informing the user that data leakage is occurring in the mobile computing device and that the mobile computing device may be infected with malicious code. The message may also inform the user of possible remedial actions, such as installing security software to remove the malicious code 206 from the mobile computing device 200. As a particular example, the message may include a link to the security software for download. The alert allows the user to take immediate steps to stop the data leakage, such as by turning OFF the mobile computing device 200 until the data leakage is resolved.

In some situations, the malicious code 206 may be configured to encrypt stolen data before transmitting the stolen data out of the mobile computing device 200. For example, the malicious code 206 may encrypt the trap data before forwarding the trap data to another device. The encryption process may prevent the lightweight engine 320 from recognizing the trap data in an outgoing communication. In one embodiment, the lightweight engine 320 is configured to work with a cloud service to detect data leakage even when the malicious code 206 manages to get around the lightweight engine 320 in the mobile computing device 200. This embodiment is now explained with reference to FIG. 4.

Figure 4:
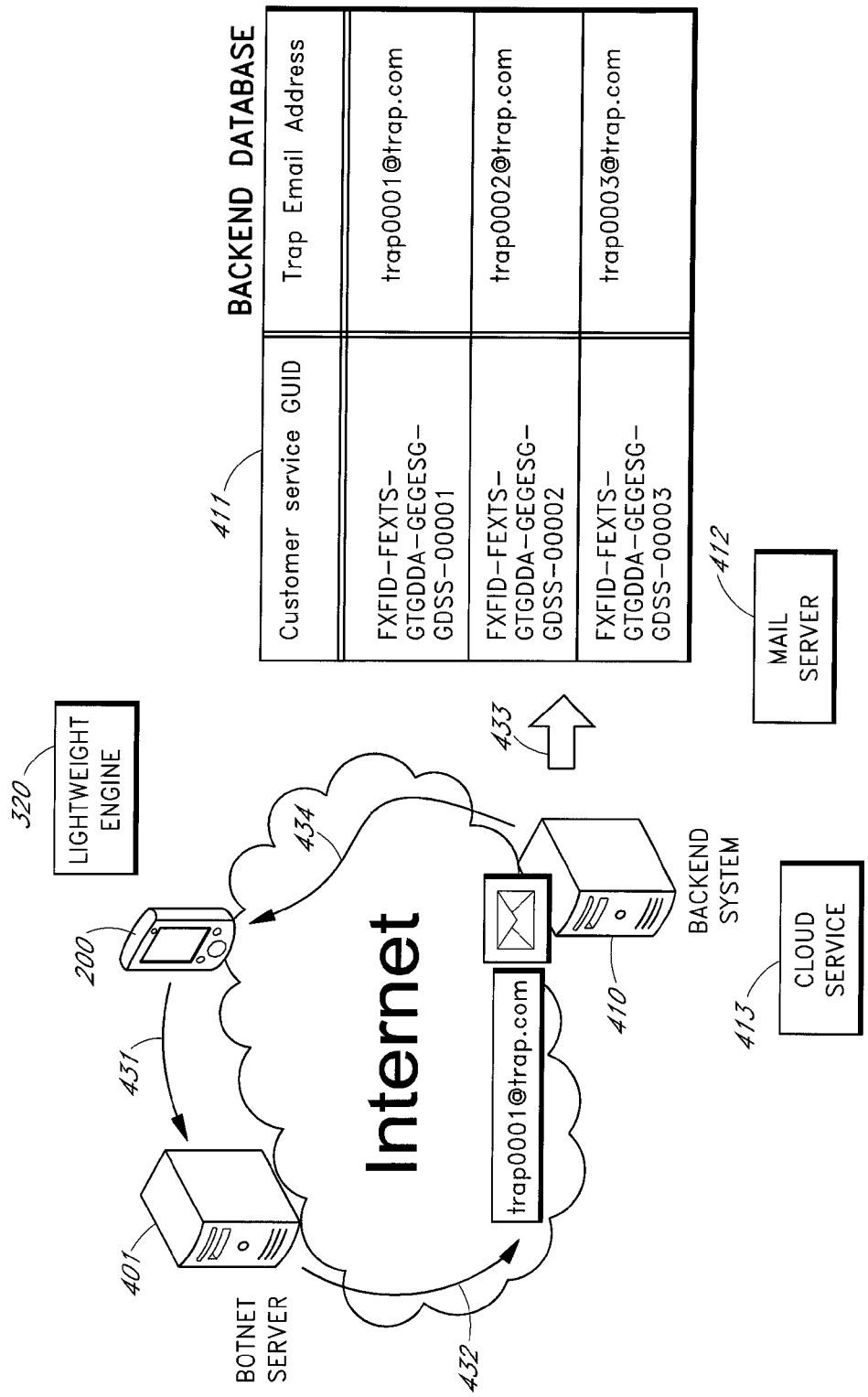
FIG. 4 shows a system for detecting data leakage in accordance with an embodiment of the present invention.

FIG. 4 shows a system for detecting data leakage in accordance with an embodiment of the present invention. In the example of FIG. 4, the system comprises the mobile computing device 200 and a backend system 410. As previously explained, the mobile computing device 200 includes the lightweight engine 320 and the mobile operating system 203.

The backend system 410 may comprise one or more computers that host the cloud service 413, which works in conjunction with the lightweight engine 320 to provide data leakage detection for mobile computing devices. The cloud service 413 is so named because it provides data leakage detection for mobile computing devices over a computer network. The cloud service 413 and the lightweight engine 320 may communicate over the Internet. In the example of FIG. 4, the backend system 410 further includes the backend database 411 and hosts the mail server 412.

In one embodiment, the lightweight engine 320 is configured to register with the cloud service 413 upon installation. The registration process may include the lightweight engine 320 generating device information for the mobile computing device 200 and providing the device information to the cloud service 413 running on the backend system 410. The device information may comprise a globally unique identifier (GUID) identifying the mobile computing device 200, trap data stored in the mobile computing device 200, and an e-mail address or other contact information provided by the user for alerting the user in the event data leakage is detected to be occurring in the mobile computing device 200. The cloud service 413 receives the device information from the lightweight engine 320 and enters the device information in the backend database 411. In the example of FIG. 4, the backend database 411 includes the GUID identifying a mobile computing device and a trap e-mail address in the mobile computing device.

In the example of FIG. 4, the backend system 410 hosts the mail server 412. In one embodiment, the mail server 412 is configured to receive e-mails that are addressed to trap e-mail addresses. The mail server 412 may be configured to inform the cloud service 413 of received e-mail addressed to a trap e-mail address.

The botnet server 401 receives stolen data, including trap data, from malicious codes running in mobile computing devices. The botnet server 401 decrypts encrypted stolen data prior to using the data. For example, upon receiving encrypted trap e-mail address from the malicious code 206 running in the mobile computing device 200 (arrow 431), the botnet server 401 decrypts the encrypted trap e-mail address to recover the trap e-mail address. When the botnet server 401 sends a spear e-mail (e.g., spam or phishing e-mail) to the trap e-mail address, the mail server 412 receives the spear e-mail (arrow 432). In response to receiving the spear e-mail in the mail server 412, the cloud service 413 consults the backend database 411 to identify the mobile computing device where the trap e-mail address was stored (arrow 433). That mobile computing device, which is the mobile computing device 200 in this example, is experiencing data leakage. Accordingly, the backend system 410 is configured to alert the user of the mobile computing device 200 by e-mail, SMS, or other means that data leakage is occurring in the mobile computing device 200 (arrow 434).

Figure 5:
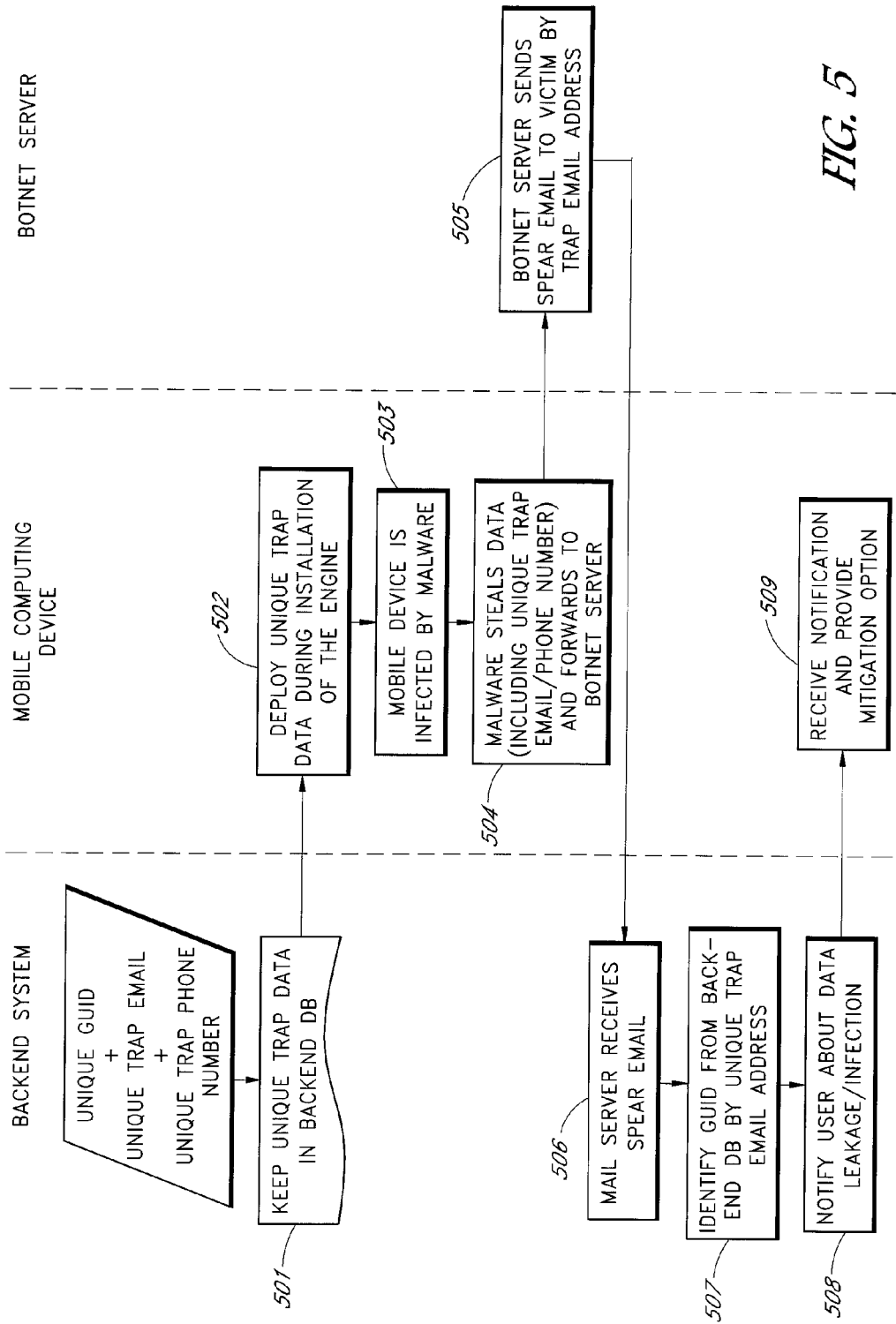
FIG. 5 shows a flow diagram of a method of detecting data leakage in accordance with an embodiment of the present invention.

FIG. 5 shows a flow diagram of a method of detecting data leakage in accordance with an embodiment of the present invention. The method of FIG. 5 is explained using the components of FIG. 4 for illustration purposes only. Other components may also be employed without detracting from the merits of the present invention. In the example of FIG. 5, the steps 501 and 506-508 are performed on the backend system 410, the steps 502-504 and 509 are performed on the mobile computing device 200, and the step 505 is performed by the botnet server 401.

The cloud service 413 stores the identifier (GUID in this example) of the mobile computing device 200, the unique trap e-mail address stored in the mobile computing device 200, and the trap phone number stored in the mobile computing device 200 in the backend database 411 (step 501). The trap data, which comprises a trap e-mail address and a trap phone number in this example, are stored in the mobile computing device 200 during installation of the lightweight engine 320 (step 502). The trap data may be stored in the mobile computing device 200 by the installation module of the lightweight engine 320 or by the lightweight engine 320 itself. The trap data may be included as an entry in a contact list, for example.

In the example of FIG. 5, the mobile computing device is infected by malicious code 206, which is also referred to as "malware" (step 503). The malicious code 206 steals data, including the trap data, from the mobile computing device 200 and provides the stolen data to the botnet server 401 (step 504). In most cases, the lightweight engine 320 would detect data leakage in the mobile computing device 200 by detecting the trap data in the outgoing communication to the botnet server 401. However, the malicious code 206 may have encrypted the stolen data or performed some unknown action that is not detectable by the lightweight engine 320. In that case, the stolen data gets transmitted out of the mobile computing device without detection and received by the botnet server 401.

To make use of stolen data, the botnet server 401 has to restore the stolen data to its original form. For example, assuming the trap data has been encrypted by the malicious code 206, the botnet server 401 has to decrypt the encrypted trap data to recover the trap data. In the example of FIG. 5, the trap data comprises the trap e-mail address stored in the mobile computing device 200 during installation of the lightweight engine 320. The botnet server 401 sends a spear e-mail to a potential victim having the trap e-mail address (step 505). In the backend system 410, the mail server 412 receives the spear e-mail (step 506). In response to receiving an e-mail addressed to a trap e-mail address, the cloud service 413 consults the backend database 411 to identify the GUID associated with the received trap e-mail address (step 507). The backend database 411 indicates that the trap e-mail address is deployed in a mobile computing device having a particular GUID. In this example, the GUID identifies the mobile computing device 200. The cloud service 413 sends the user a message informing the user that data leakage is occurring in the mobile computing device 200. The message, which may include mitigation options (e.g., download an antivirus from the vendor of the lightweight engine 320), is received in the mobile computing device 200 (step 509), alerting the user that the mobile computing device 200 may be infected and that data leakage is occurring in the mobile computing device.

As can be appreciated from the foregoing, embodiments of the present invention provide advantages heretofore unrealized. First, because the lightweight engine 320 only has to look for particular trap data, the lightweight engine 320 does not necessarily have to perform complex content scanning or hooking. This allows the lightweight engine 320 to have minimal memory and processing consumption, making the lightweight engine 320 especially suitable for mobile computing devices. Second, the lightweight engine 320 does not necessarily require signatures of known viruses. As can be appreciated, such signatures require teams of antivirus researchers to develop and require relatively large pattern files, which prohibit their deployment in mobile computing devices. There is also a delay between detecting malicious code and developing the signature for the malicious code. In embodiments of the present invention, the lightweight engine 320 only has to recognize its own trap data, which is relatively simple. Third, the lightweight engine 320 in conjunction with the cloud service 413 allows for detection of data leakage even when the malicious code performs complex and yet to be understood algorithms to steal data. Since stolen data needs to be employed to be useful to the cyber criminal, the cloud service 413 will be able to detect usage of the trap data and alert the victimized mobile computing device of the data leakage.

Data leakage detection for mobile computing devices has been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of detecting data leakage, the method comprising:
   storing a trap e-mail address and a trap telephone number in a contact list in a mobile computing device;
   in a backend system, receiving an e-mail addressed to the trap e-mail address and containing the trap telephone number;
   determining that the trap e-mail address and the trap telephone number are stored in the mobile computing device; and in response to receiving the e-mail addressed to the trap e-mail address and containing the trap telephone number in the backend system, detecting that data leakage is occurring in the mobile computing device.

2. The method of claim 1 wherein determining that the trap e-mail address is stored in the mobile computing device comprises:
consulting a database to determine that the trap e-mail address is stored in a device having a globally unique identifier (GUID) of the mobile computing device.

3. The method of claim 1 wherein the trap e-mail address is stored in the mobile computing device in conjunction with installation of a lightweight engine configured to monitor outgoing communications of the mobile computing device for the trap e-mail address.

4. The method of claim 3 further comprising:
monitoring the outgoing communications of the mobile computing device for presence of the trap e-mail address.

5. The method of claim 1 further comprising alerting a user of the mobile computing device of the data leakage.

6. The method of claim 1 further comprising:
providing a link to download an antivirus to the mobile computing device.

7. A system for detecting data leakage, the system comprising:
a mobile computing device having a storage device storing trap data, the mobile computing device including a lightweight engine configured to detect data leakage in the mobile computing device by monitoring outgoing communications of the mobile computing device for the trap data; and
a backend system configured to detect for data leakage occurring in the mobile computing device by monitoring for communications including the trap data,
wherein the trap data comprises a trap telephone number stored in a contact list in the mobile computing device.

8. The system of claim 7 wherein the trap data further comprises a trap e-mail address and the backend system is configured to monitor for an e-mail addressed to the trap e-mail address to detect data leakage in the mobile computing device.

9. The system of claim 7 wherein the lightweight engine is configured to monitor the outgoing communications of the mobile computing device for the trap telephone number.

10. The system of claim 7 wherein the trap data is stored in a contact list in the mobile computing device.

11. The system of claim 7 wherein the backend system hosts a mail server that monitors for e-mails including the trap data.

12. The system of claim 11 wherein the trap data comprises a trap e-mail address and the mail server monitors for e-mails addressed to the trap e-mail address.

13. The system of claim 12 wherein the mobile computing device comprises a mobile phone.

* * * * *